March 2, 1965  J. B. SIMMS  3,171,574
DETACHABLE BOTTLE HANDLE
Filed May 7, 1963
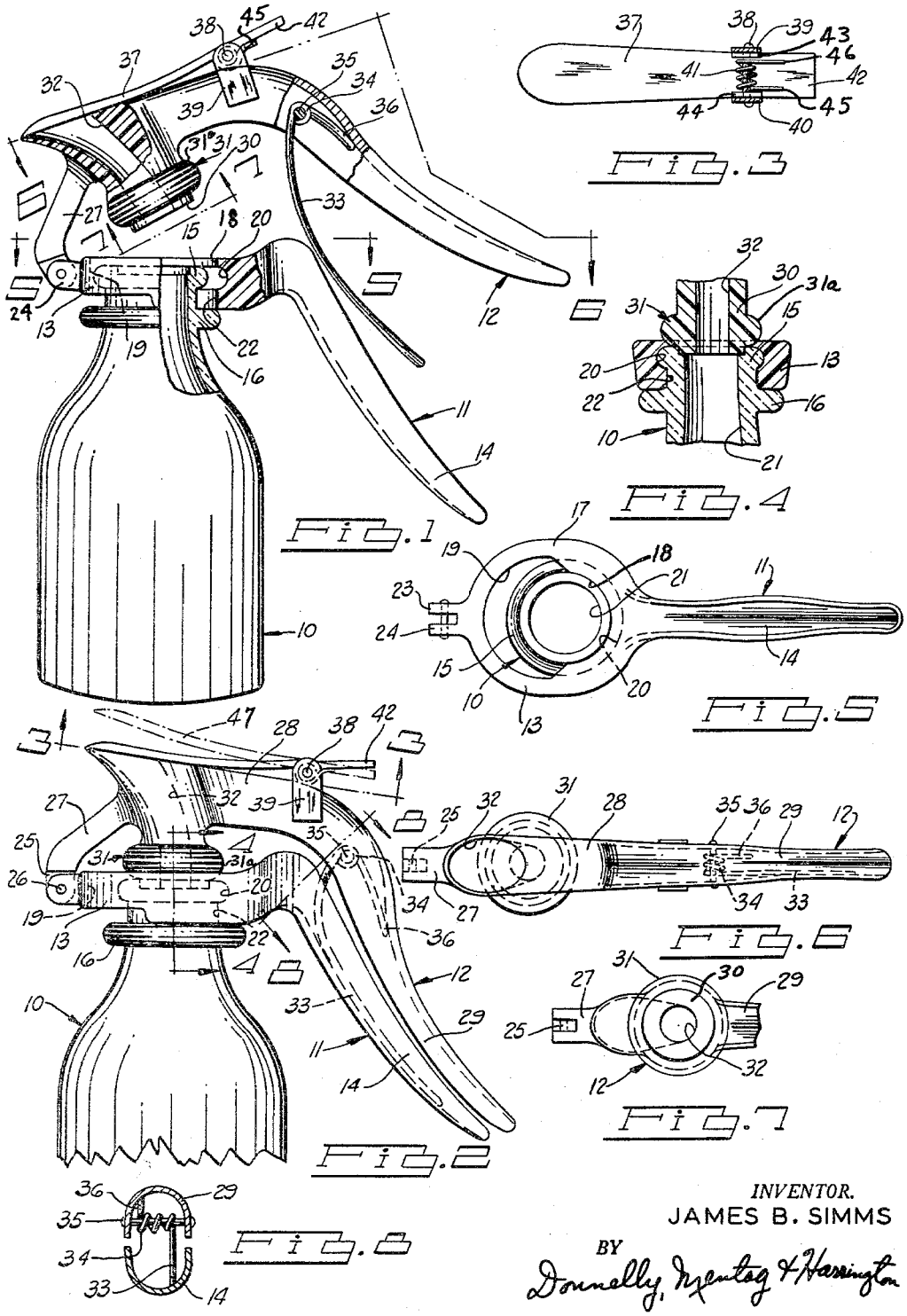
INVENTOR.
JAMES B. SIMMS
BY
Donnelly, Mentag & Harrington
ATTORNEYS

United States Patent Office 3,171,574
Patented Mar. 2, 1965

3,171,574
DETACHABLE BOTTLE HANDLE
James B. Simms, 8441 Birch Road, Taylor, Mich.
Filed May 7, 1963, Ser. No. 278,699
5 Claims. (Cl. 222—467)

This invention relates to a novel and improved bottle handle, and more particularly, to a handle of this type which is adapted to be snapped in position on a bottle in a quick and easy manner.

It is customary at the present time to purchase milk, fruit juices and the like in large bottles, as for example in half-gallon sizes. The size and weight of such large bottles make it difficult to handle and pour from them. Accordingly, it is the primary object of the present invention to provide a novel and improved bottle handle means to enable the user thereof to handle a large milk, fruit juice, kitchen cleanser bottle or the like, and pour the contents therefrom in an easy and efficient manner.

It is another object of the present invention to provide a novel and improved bottle handle which may be quickly and easily mounted on a bottle, and which is simple and compact in construction, economical of manufacture, and light in weight.

It is a further object of the present invention to provide a novel and improved bottle handle which includes a lower handle portion adapted to be snapped onto the pouring end of a bottle, and which further includes an upper handle portion hingedly connected to the lower handle portion for enclosing the open end of the bottle and which includes an efficient pouring spout.

Other objects, features and advantages of this invention will be apparent from the following detailed description, appended claims, and the accompanying drawing.

In the drawings:

FIG. 1 is a side elevational view, with parts broken away and with parts in section, of a bottle handle made in accordance with the principles of the present invention being assembled on a milk bottle;

FIG. 2 is a side elevational view of the bottle handle structure illustrated in FIG. 1, and showing the handle in a fully mounted position on the bottle;

FIG. 3 is a bottom plan view of a cover means employed in the invention, taken along the line 3—3 of FIG. 2, and looking in the direction of the arrows;

FIG. 4 is a fragmentary elevational sectional view of the structure illustrated in FIG. 2, taken along the line 4—4 thereof and looking in the direction of the arrows;

FIG. 5 is a top plan view of the lower handle portion, taken along the line 5—5 of FIG. 1 and looking in the direction of the arrows;

FIG. 6 is a top plan view of the upper handle portion, taken along the line 6—6 of FIG. 1, and looking in the direction of the arrows;

FIG. 7 is a fragmentary bottom plan view of the upper handle portion shown in FIG. 1, taken along the line 7—7 thereof and looking in the direction of the arrows; and, FIG. 8 is a fragmentary elevational sectional view of the structure illustrated in FIG. 2, taken along the line 8—8 thereof and looking in the direction of the arrows.

Referring now to the drawings and in particular to FIGS. 1 and 2, the numeral 10 generally indicates a large size milk bottle on which an illustrative bottle handle of the present invention is mounted. The illustrative embodiment of the invention includes the lower handle portion 11 on which is hingedly mounted the upper handle portion 12. The lower handle portion 11 includes the substantially oval shaped mounting member 13 which is provided on the rear end thereof with the integral downwardly extended handle arm 14.

As shown in FIGS. 1 and 2, the bottle 10 is provided with the upper or pouring lip 15 on the extreme upper end thereof. The bottle 10 is provided with a second or lower outwardly extended lip 16 which is spaced downwardly a distance apart from the upper lip 15. The milk bottle 10 is illustrative of the usual type of milk bottle construction and especially of the type employed in large milk bottles, as for example a half-gallon size milk bottle.

As shown in FIGS. 1, 2 and 5, the lower handle mounting member 13 is provided with a bottle clamping portion on the rear side thereof. The upper surface 17 of the mounting member 13 is flat. The mounting member 13 is provided with a hole therethrough which is formed substantially by the front half semi-circle 19 and the rear half semi-circle 20. The numeral 21 indicates the upper open end of the milk bottle 10.

As shown in FIGS. 1 and 2, the upper and lower side walls of the semi-circular opening 20 are indicated by the numerals 18 and 22. The side walls 18 and 22 of the opening 20 form a concave recess around the periphery thereof, as shown in FIGS. 1 and 2. The recessed opening 20 receives the upper lip 15 of the bottle 10, and holds the same in a releasable gripping manner. The upper and lower lips 18 and 22 of the opening 20 engage the bottle upper lip 15 as shown in FIG. 2. When placing the lower handle portion 11 on the upper end of the bottle 10, the lower handle portion 11 is first lowered over the top of the bottle as shown in FIG. 1, so that the upper end of the bottle enters the larger semi-circular opening 19. The lower handle portion 11 is then moved to the left, as viewed in FIG. 2, so as to bring the lower handle portion 11 into gripping engagement with the bottle lip 15. The bottle lip 15 is adapted to be snapped into place into the recessed opening 20 as shown in FIG. 2. The dimension of the smaller recessed opening 20 is made such that it is slightly smaller than the curvature of the bottle lip 15 so as to provide a snug gripping engagement therewith.

As shown in FIGS. 1 and 5, the lower handle mounting member 13 is provided on the front end thereof with the two pivot arms 23 and 24 which form a pivot bracket mounting for the upper handle portion. Pivotally mounted between the pivot arms 23 and 24, by means of the pivot pin 26 is the mounting leg pivot portion 25 of the mounting leg 26 which is integrally connected at the upper end thereof to the upper handle portion 12. As shown in FIGS. 2 and 6, the upper handle portion 12 includes the body portion 28 to which is integrally connected the rearwardly and downwardly extended curved gripping arm portion 29. As best seen in FIGS. 1 and 2, the upper handle body portion 28 is provided with the circular downwardly extended integral closure member 30 which is adapted to be seated in the upper open end 21 of the milk bottle 10. The closure member 30 is provided with the sealing lip 31 which surrounds the closure member 30 and which extends outwardly beyond the body member 30 and is provided with the curved peripheral surface indicated by the numeral 31a. As shown in FIGS. 1 and 2, the upper handle portion is provided with a pouring or discharge passage 32 which terminates at the outer end thereof in the pouring spout.

As shown in FIGS. 1, 2 and 8, the bottle holder of the present invention may be provided with a spring between the two handle grip members 14 and 29, if desired. One leg of the spring 33 is shown as disposed inside of the U-shaped gripping arm portion 14 and the other leg of the spring is indicated by the numeral 36, and is disposed inside of the inverted U-shaped upper handle portion gripping arm 29. Spring portions 33 and 36 are connected by means of the coiled spring portion 34 which is rotatably mounted on the pin 35, mounted transversely between the legs of the hollow gripping handle portion 29.

As shown in FIGS. 1, 2 and 3, the upper handle portion 12 is provided with a pivotally mounted cover or closure member 37 adapted to enclose the outer end of the discharge passage 32 to prevent foreign matter from contaminating the fluid in the bottle 10 when the pouring operation is not in process and yet permit pouring from the bottle 10 when desired. The cover member 37 is integrally formed on the front end of the lever arm 42. The cover lever or operating arm 42 is provided with a pair of downwardly extended hinge arms 43 and 44 which are adapted to be disposed between the mating hinge arms 39 and 40 which are fixedly secured on opposite sides of the upper end of the arm 29. A pivot or hinge pin 38 is mounted through the hinge arms 39, 40, 43 and 44 for pivotally mounting the cover 37 on the upper handle portion 12. The coiled spring 41 is mounted around the hinge pin 38 between the aforementioned hinge arms and one end 45 of this spring engages the underside of the spring lever 42 and the other end 46 engages the top outer surface of the handle 29. It will be seen that the spring 41 functions to bias the handle 37 to the solid line, closed position as shown in FIG. 2. A downward pressure on the rear end of the lever 42 will move the cover 37 to the dotted line position 47 as shown in FIG. 2 to permit pouring of milk or other fluid from the bottle 10. The amount of opening of the cover member 37 will depend, of course, upon the particular desired structure employed.

In use, the bottle handle of the present invention is disposed relative to the bottle 10 so as to bring the mouth of the bottle into the front circle 19 of the lower handle 11. The lower handle is then pressed forwardly until it snaps in place. The upper handle portion 12 is then brought downwardly to bring the closure member 30 into the neck 20 of the bottle 10, and the bottle handle is then ready for use. The handle may be detached from the bottle 10 by reversing the aforestated steps. The handle is preferably made out of stainless steel or a fine grade of aluminum that may be washed thoroughly in the same manner as any other kitchen utensil.

It will be seen that the construction of the handle portions 11 and 12 provides the user with a balanced effect whereby the tipping of the bottle 10 is made easier for pouring purposes. The bottle handle of the present invention enables the user to manipulate a full bottle of milk or other fluid with ease. If desired, when tipping the bottle 10 over to a great extent, the other hand of the user can be used to support the underside of the bottle for further efficient pouring. It will also be seen that the small outlet end of the discharge or outlet hole 32 provides a more efficient and controllable stream of fluid from the bottle 10 as compared to the large mouth 21 of the bottle 10. The closure member 30 and the sealing ring 31 function to completely seal the mouth of the bottle 10 so that there is no leakage around the closure portion 30. The handle members 14 and 29 are preferably made hollow as shown for a lightweight construction and they are contoured to fit the hand of a user to prevent slippage. It will be understood that the handle may be adapted for use on many types of bottles, as for example, kitchen cleanser bottles, milk bottles, whiskey bottles and the like by merely changing the sizes of the appropriate mounting parts.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. A detachable bottle handle comprising: a lower handle portion; an upper handle portion hingedly mounted for independent motion relative to said lower handle portion; means on said lower handle portion for detachably engaging the periphery of the open end of a bottle; closure means on said upper handle portion for closing the open end of a bottle; and, an outlet passage formed through said closure means for pouring the contents of the bottle therethrough.

2. A detachable bottle handle comprising: a lower handle portion; an upper handle portion hingedly mounted on said lower handle portion; means on said lower handle portion for detachably mounting the same on the open end of a bottle including a mounting member, a first opening formed through said mounting member, a second opening formed through said mounting member and communicating with said first opening, and, bottle gripping means formed around said second opening for releasably gripping the open end of a bottle when it is first moved into said first opening and then into said second opening.

3. A detachable bottle handle as defined in claim 2, including, a hand grip member formed on each of said handle portions.

4. A detachable bottle handle as defined in claim 2, including, biasing means mounted between said handle portions for normally biasing said handle portions apart.

5. A detachable bottle handle as defined in claim 2, including, movable cover means for normally enclosing said outlet passage.

References Cited in the file of this patent

UNITED STATES PATENTS 1,524,698     Eustage _____ Feb. 3, 1925